(12) United States Patent
Kohinata et al.

(10) Patent No.: US 8,066,907 B2
(45) Date of Patent: Nov. 29, 2011

(54) LIQUID CRYSTALLINE POLYESTER RESIN COMPOSITION, MOLDED ARTICLE AND HOLDER FOR OPTICAL PICKUP LENSES

(75) Inventors: Yusaku Kohinata, Tokyo (JP); Mitsuo Maeda, Tsukuba (JP); Hiroshi Harada, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/890,844

(22) Filed: Sep. 27, 2010

(65) Prior Publication Data

US 2011/0073807 A1    Mar. 31, 2011

(30) Foreign Application Priority Data

Sep. 29, 2009 (JP) .................. 2009-225148

(51) Int. Cl.
- C09K 19/06 (2006.01)
- C09K 19/54 (2006.01)
- C09K 19/20 (2006.01)
- C08K 3/04 (2006.01)
- C08K 3/34 (2006.01)
- C08K 7/04 (2006.01)
- C08K 7/22 (2006.01)
- C08L 67/03 (2006.01)
- G02B 7/02 (2006.01)

(52) U.S. Cl. ............. 252/299.6; 252/299.01; 252/299.5; 252/299.67; 524/493; 524/495; 524/496; 359/802; 359/819

(58) Field of Classification Search ............. 252/299.01, 252/299.5, 299.6, 299.67; 524/493, 495, 524/496; 359/802, 819
See application file for complete search history.

(56) References Cited

U.S. PATENT DOCUMENTS

| | | | | |
|---|---|---|---|---|
| 7,790,055 | B2 * | 9/2010 | Murouchi et al. | 252/299.01 |
| 7,824,572 | B2 * | 11/2010 | Okamoto | 252/299.01 |
| 7,985,351 | B2 * | 7/2011 | Yamauchi et al. | 252/299.01 |

* cited by examiner

Primary Examiner — Shean Wu
(74) Attorney, Agent, or Firm — Panitch Schwarze Belisario & Nadel LLP

(57) ABSTRACT

A liquid crystalline polyester resin composition is provided, by which a molded article with an enhanced specific modulus can be produced. The liquid crystalline polyester resin composition comprises mica fillers in an amount of 15 to 30 parts by mass and carbon fibers with specific volume resistance of $10^8$ Ωcm or more in an amount of 5 to 20 parts by mass with respect to 100 parts by mass of the liquid crystalline polyester.

9 Claims, 1 Drawing Sheet

LIQUID CRYSTALLINE POLYESTER RESIN COMPOSITION, MOLDED ARTICLE AND HOLDER FOR OPTICAL PICKUP LENSES

BACKGROUND OF THE INVENTION

1. Field of the Invention

The present invention relates to a liquid crystalline polyester resin composition which is suitable for being applied to optical pickup members such as a holder for optical pickup lenses, a base frame and the like, a molded article and a holder for optical pickup lenses.

2. Description of the Related Art

Hitherto, in response to a demand for a reduction in the weight of the optical pickup member of this kind, attempts to switch a constituent material of the pickup member from a metal material to a resin material were made. Particularly, since a liquid crystalline polyester resin composition containing glass fibers mixed is superior in mechanical properties, moldability, dimensional accuracy, heat resistance and a damping property among resin material, it is adopted as optical pickup members.

However, the demand for a damping property becomes severe with increases in capacity and speed of information which recent digital disk drive systems handle. As the countermeasure for this, it is required that a secondary resonance frequency of the optical pickup member is shifted to a high frequency side and a width of gain is enlarged, namely, that the rigidity of the optical pickup member is increased (resonance frequency is proportional to the half power of specific modulus; increases in a MD direction and a TD direction), it becomes clear that the conventional liquid crystalline polyester resin composition cannot response to this demand.

As the liquid crystalline polyester resin compositions which are suitable for these optical pickup members, a resin composition composed of liquid crystalline polyester and aluminum borate whiskers is disclosed (for example, JP-A-11-80517) and a resin composition composed of liquid crystalline polyester, glass fibers and spherical hollow bodies, which is aimed at reducing the weight, is disclosed (for example, JP-A-2004-143270).

SUMMARY OF THE INVENTION

However, the specific gravity of a molded article composed of the liquid crystalline polyester resin composition disclosed in JP-A-11-80517 is large. Further, the specific gravity of a molded article composed of the liquid crystalline polyester resin composition disclosed in JP-A-2004-143270 is small, but the modulus of the molded article is low. Therefore, in both molded articles, a value obtained by dividing the modulus by the specific gravity, that is the specific modulus is not adequately high, and it has been strongly desired to improve such problems.

Then, in view of the above state of the art, it is an object of the present invention to provide a liquid crystalline polyester resin composition which can enhance the specific modulus of the molded article, a molded article and a holder for optical pickup lenses.

In order to achieve such objects, the present inventors made earnest investigations, and consequently have obtained a liquid crystalline polyester resin composition which can provide a molded article with an enhanced specific modulus of the resulting by utilizing fillers and liquid crystalline polyester. This finding has now led to completion of the present invention.

Namely, the present invention provides a liquid crystalline polyester resin composition comprising:

mica fillers in an amount of 15 to 30 parts by mass; and carbon fibers with specific volume resistance of $10^8$ Ωcm or more in an amount of 5 to 20 parts by mass with respect to 100 parts by mass of the liquid crystalline polyester.

Also, the present invention provides a molded article formed by molding the liquid crystalline polyester resin described above. Moreover, the present invention provides a holder for optical pickup lenses comprising such a molded article as a bobbin.

In accordance with the present invention, it becomes possible to enhance the specific modulus of the molded article composed of the liquid crystalline polyester resin composition since the liquid crystalline polyester resin composition is formed by mixing specific fillers in the liquid crystalline polyester in the specific proportions.

Accordingly, the liquid crystalline polyester resin composition becomes extremely useful particularly as a material for producing the optical pickup lens members such as a holder for optical pickup lenses and the like, which increasingly require reduction in thickness and complication of shape.

DETAILED DESCRIPTION OF THE PREFERRED EMBODIMENT

Hereinafter, the present invention will be described referring to embodiments which can be obtained in the present invention.

Figure 1:
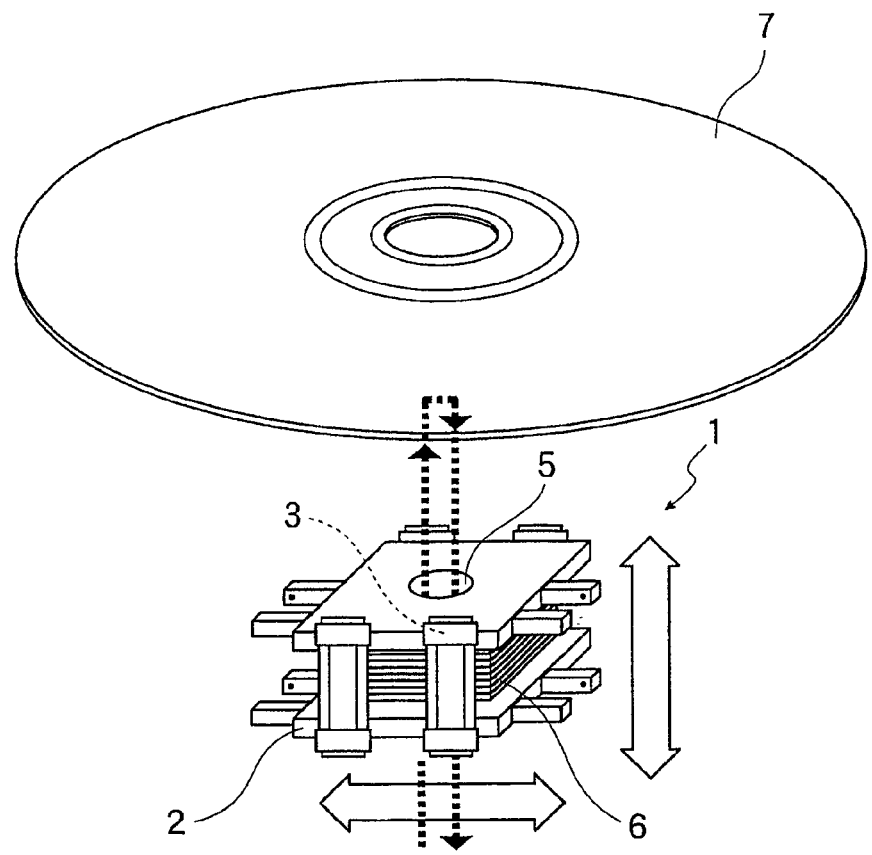
FIG. 1 is a perspective view showing a usage state of a holder for optical pickup lenses of Embodiment 1 in the present invention.

One embodiment (Embodiment 1) which can be provided by the present invention is shown in FIG. 1.

A holder 1 for optical pickup lenses of Embodiment 1 has a block-shaped bobbin 2 as shown in FIG. 1. In the bobbin 2, an optical conduction hole 3 having a circular cross-section is formed through the bobbin in a vertical direction so that laser light can be conducted in reading/writing data on an optical disk 7 such as Blu-ray disk, and a lens 5 is placed at an upper opening of the optical conduction hole 3. A conducting wire 6 is wound around the bobbin 2 in the form of a coil in the manner of surrounding the optical conduction hole 3 in order to form a magnetic field.

Here, the bobbin 2 is composed of a molded article formed by melt-molding a specific liquid crystalline polyester resin composition. This liquid crystalline polyester resin composition is one containing micas having a volume-average particle diameter of 40 μm or less and a specific surface area of 6 m$^2$/g or less in an amount of 15 to 30 parts by mass, carbon fibers having specific volume resistance (volume resistivity) of $10^8$ Ωcm or more and a specific modulus (value obtained by dividing the modulus by the specific gravity) of 30 GPa or more in an amount of 5 to 20 parts by mass, and hollow fillers in an amount of 10 parts by mass or less with respect to 100 parts by mass of the liquid crystalline polyester.

A liquid crystalline polyester resin composition of the present invention comprises mica fillers and carbon fibers.

Hereinafter, each component of the liquid crystalline polyester resin composition will be described in turn.

First, the liquid crystalline polyester used in the present invention is polyester referred to as thermotropic liquid crystalline polymer and it is preferably obtained by polymerizing an aromatic hydroxycarboxylic acid, an aromatic dicarboxylic acid and aromatic diol, and forms a melt exhibiting optical anisotropy at a temperature of 400° C. or lower.

In addition, in order to produce the liquid crystalline polyester more easily, apart of the raw material monomers such as the aromatic hydroxycarboxylic acid, the aromatic dicarboxylic acid and the aromatic diol can be converted to ester-forming derivatives and then they can be polymerized.

The ester-forming derivatives are, for example, as follows. In the case of the aromatic hydroxycarboxylic acid and the aromatic dicarboxylic acid having a carboxylic group in its molecule, the ester-forming derivatives include ester-forming derivatives obtained by converting the carboxylic group to a highly reactive acid-halogen group or a group of acid anhydride, and ester-forming derivatives obtained by converting the carboxylic group to ester which produces polyester through trans-esterification. In the case of the aromatic hydroxycarboxylic acid and the aromatic diol, which have a phenolic hydroxyl group in a molecule, the ester-forming derivatives include ester-forming derivatives obtained by converting the phenolic hydroxyl group to ester so as to produce polyester through trans-esterification. A method for producing favorable liquid crystalline polyester using such the ester-forming derivative will be described later.

Specific examples of structural units composing the liquid crystalline polyester are shown below.

Structural units derived from the aromatic hydroxycarboxylic acid:

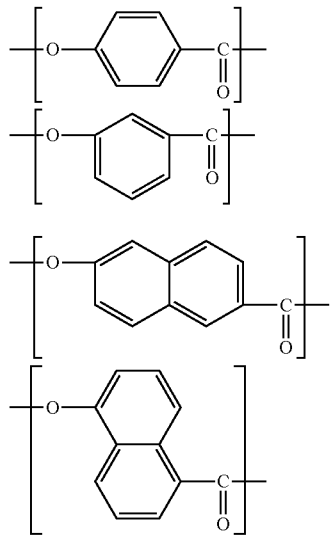

In these structural units, a substituent group selected from halogen atoms, an alkyl group and an aryl group may be substituted for a part of hydrogen atoms in the aromatic ring.

Structural units derived from the aromatic dicarboxylic acid:

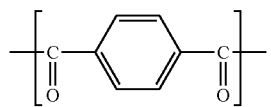

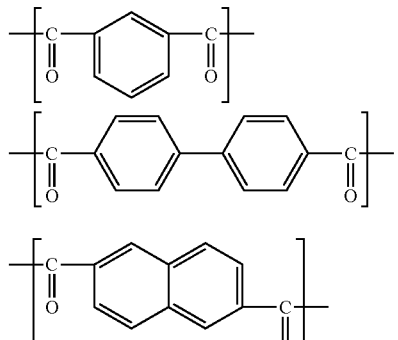

In these structural units, a substituent group selected from halogen atoms, an alkyl group and an aryl group may be substituted for a part of hydrogen atoms in the aromatic ring.

Structural units derived from the aromatic diol:

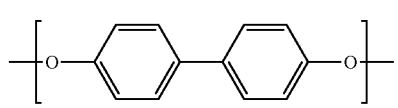

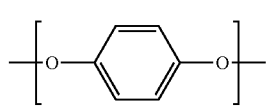

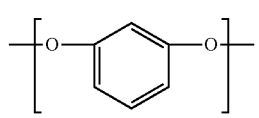

In these structural units, a substituent group selected from halogen atoms, an alkyl group and an aryl group may be substituted for a part of hydrogen atoms in the aromatic ring.

The substituent group optionally contained in the above-mentioned structural units will be described briefly. Examples of the halogen atoms include a fluorine atom, a chlorine atom and a bromine atom. Examples of the alkyl groups include lower alkyl groups having about 1 to 4 carbon atoms such as a methyl group, an ethyl group and a butyl group. Furthermore, typical examples of the aryl groups include a phenyl group. However, since as described later, the liquid crystalline polyester preferably has a flow beginning temperature of 360° C. or higher, it is desired that the structural unit does not have these substituent groups in order to attain the liquid crystalline polyester having such a flow beginning temperature.

Favorable combinations of the structural units of the liquid crystalline polyester previously exemplified will be described in detail.

As the combinations of the structural units of the liquid crystalline polyester, combinations shown in the following paragraphs (a), (b), (c), (d), (e) and (f) (hereinafter, will be referred to as paragraphs (a) to (f)) are preferable.

(a): Combination of ($A_1$), ($B_1$) and/or ($B_2$), and ($C_1$)
(b): Combination of ($A_1$) and ($A_2$)

(c): Combination obtained by replacing a part of $(A_1)$ with $(A_2)$ in combinations of the structural units in (a)

(d): Combination obtained by replacing a part of $(B_1)$ with $(B_3)$ in combinations of the structural units in (a)

(e): Combination obtained by replacing a part of $(C_1)$ with $(C_3)$ in combinations of the structural units in (a)

(f): Combination obtained by adding the structural units $(B_1)$ and $(C_1)$ to combinations of the structural units in (b)

In the above-mentioned combinations shown in paragraphs (a) to (f), the proportion of a structural unit of $(A_1)$ derived from p-hydroxybenzoic acid is preferably 30 mol % or more with respect to the total amount of all structural units, and more preferably 45 mol % or more. When the molar ratio of $(A_1)$ is like this, the resulting liquid crystalline polyester achieves the excellent balance between properties such as heat resistance, mechanical strength and the like.

Further, in the above-mentioned combinations of the structural units shown in paragraphs (a) to (f), it is possible to produce the liquid crystalline polyester having a favorable flow beginning temperature, that is, a flow beginning temperature of 360° C. or higher by using the fact that the flow beginning temperature is increased if the linearity of a molecule chain of the liquid crystalline polyester is improved. More specifically, in the $(B_1)$ and the $(B_2)$, since the $(B_1)$ improves the linearity of a liquid crystalline polyester molecule and the $(B_2)$ improves the bending property (deteriorates the linearity) of a liquid crystalline polyester molecule, the flow beginning temperature can be adjusted by changing a ratio between the $(B_1)$ and the $(B_2)$ in copolymerization.

Among the liquid crystalline polyesters previously exemplified, the liquid crystalline polyester of the (a), that is, the liquid crystalline polyester having a structural unit $[(A_1)]$ derived from p-hydroxybenzoic acid, a structural unit $[(C_1)]$ derived from 4,4-dihydroxybiphenyl, a structural unit derived from terephthalic acid and/or a structural unit derived from isophthalic acid $[(B_1)$ and/or $(B_2)]$ is preferable.

Further, in this case, a molar ratio of $((C1)/(A1))$ is preferably 0.2 or more and 1.0 or less, a molar ratio of $[(B1)+(B2)]/(C1)$ is preferably 0.9 or more and 1.1 or less, and a molar ratio of the $(B2)/(B1)$ is preferably more than 0 and 1 or less and more preferably more than 0 and 0.3 or less.

As described above, the liquid crystalline polyester preferably has a flow beginning temperature of 360° C. or higher, more preferably has a flow beginning temperature of 360° C. or higher, more preferably has a flow beginning temperature of 360° C. to 410° C., and particularly preferably has a flow beginning temperature of 370° C. to 400° C. When the flow beginning temperature of the liquid crystalline polyester is in such the range, heat resistance of the liquid crystalline polyester itself is adequately exhibited and solder resistance of a molded article formed by using the liquid crystalline polyester resin composition becomes extremely high and it is possible to prepare the molded article at a practical molding temperature. In addition, the flow beginning temperature referred to herein means a temperature at which the liquid crystalline polyester exhibits melt viscosity of 4800 Pa·sec (48000 poises) at the time when the liquid crystalline polyester is extruded from a nozzle at a temperature rise rate of 4° C./min under a load of 9.8 MPa (100 kgf/cm²) by using a capillary type rheometer equipped with a die having an inner diameter of 1 mm and a length of 10 mm. This flow beginning temperature is a measure representing the molecular weight of liquid crystalline polyester (see, Naoyuki Koide (edition), "Liquid Crystal Polymer Synthesis, Molding, and Application", pp 95-105, CMC, published on Jun. 5, 1987), which is well-known in this area.

Next, the method for producing the liquid crystalline polyester will be described.

It is preferred that the liquid crystalline polyester is produced by a production method comprising an acylation step in which the phenolic hydroxyl groups of aromatic diol and aromatic hydroxycarboxylic acid are acylated with a fatty acid anhydride (acetic acid anhydride, etc.) to obtain acylated products (acylated aromatic diol and acylated aromatic hydroxycarboxylic acid), and a polymerization step in which an acyl group of the acylated products obtained is polymerized with carboxyl groups of acylated aromatic dicarboxylic acid and the acylated aromatic hydroxycarboxylic acid so as to cause trans-esterification to prepare liquid crystalline polyester.

In consideration of the amount of the aromatic diol and/or the aromatic hydroxycarboxylic acid to be used, the amount of the fatty acid anhydride, such as acetic acid anhydride, to be used is preferably 1.0 to 1.2 times by mole larger than a total amount of the phenolic hydroxyl groups in these raw material monomers, more preferably 1.0 to 1.15 times by mole, furthermore preferably 1.03 to 1.12 times by mole, and particularly preferably 1.05 to 1.1 times by mole.

The acylation reaction between the aromatic dial and the aromatic hydroxycarboxylic acid in the acylation step is preferably performed at 130 to 180° C. for 30 minutes to 20 hours, and more preferably performed at 140 to 160° C. for 1 to 5 hours.

Next, the polymerization step, in which an acyl group of the acylated products (acylated aromatic diol and acylated aromatic hydroxycarboxylic acid) obtained by the above acylation step is polymerized with carboxyl groups of the acylated aromatic dicarboxylic acid and the acylated aromatic hydroxycarboxylic acid through the trans-esterification between the acyl group and the carboxyl group, will be described. In addition, the aromatic dicarboxylic acid may exist in a reaction system during the acylation step, in other words, in the acylation step, the aromatic diol, the aromatic hydroxycarboxylic acid, and the aromatic dicarboxylic acid may exist in the same reaction system. The reason for this is that both the carboxyl group in the aromatic dicarboxylic acid and a substituent group which may be optionally substituted are not affected by the fatty acid anhydride at all. Therefore, the form, in which the aromatic diol, the aromatic hydroxycarboxylic acid and the aromatic dicarboxylic acid are charged into the same reactor to acylate them with a fatty acid anhydride, may be employed, or the form, in which the aromatic diol and the aromatic hydroxycarboxylic acid are previously charged into the reactor to acylate them with a fatty acid anhydride and then the aromatic dicarboxylic acid is charged into the reactor, may be employed. The former form is more preferable from ease of operation.

The above-mentioned polymerization through the trans-esterification is preferably performed while heating the reactant at a temperature raising rate of 0.1 to 50° C./min between 130° C. and 400° C., and more preferably performed while heating the reactant at a temperature raising rate of 0.3 to 5° C./min between 150° C. and 350° C.

Further, when carrying out the trans-esterification, by-produced fatty acids (acetic acid, etc.) and the unreacted fatty acid anhydride (acetic acid anhydride, etc.) are preferably distilled off out of the reaction system by evaporation in order to shift the equilibrium in reaction according to Le Chatelier-Braun's law (principle of mobile equilibrium). Further, raw material monomers evaporated or sublimated with the fatty acid can also be condensed or reverse sublimated and returned to the reactor by refluxing a part of a fatty acid distilled to return it to the reactor.

The acylation reaction and the trans-esterification may be carried out by use of a batch apparatus or by a continuous apparatus. The liquid crystalline polyester applied to the present invention can be prepared whichever reacting apparatus (reactor) is used.

Further, after the above-mentioned polymerization step, the resulting liquid crystalline polyester is cooled and taken out, and the liquid crystalline polyester can be milled to provide a powder-form liquid crystalline polyester or the powder-form liquid crystalline polyester can be granulated to provide a pellet-form liquid crystalline polyester, and the resulting solid-form (powder-form or pellet-form) liquid crystalline polyester can be heated to provide a polymer having a higher molecular weight. The formation of a polymer having a higher molecular weight like this is referred to as solid phase polymerization in this area. The solid phase polymerization is particularly effective for the formation of a polymer having a higher molecular weight, and by forming a polymer having a higher molecular weight, it becomes easy to obtain the liquid crystalline polyester having a favorable flow beginning temperature described above. As the reaction conditions of the solid phase polymerization, a method, in which the solid-form liquid crystalline polyester is heat treated for 1 hour to 20 hours in an atmosphere of an inert gas (nitrogen) or in a reduced pressure, is employed. In this case, examples of the apparatus to be used for heat treatment include a dryer, a reacting machine, an inert oven, a mixing machine, and an electric furnace which are known.

Another component of the liquid crystalline polyester resin composition of the present application is mica fillers.

The mica fillers are made of mica, which is alumino-silicate containing alkali metal. There are various micas for fillers, which is commercially available in the market. Among these commercially available micas, mica produced from the so-called muscovite is preferable. Examples of the mica fillers include mica fillers produced from muscovite and mica produced from phlogopite are predominantly commercially available. Any mica filler can be used in the present invention. However, when the mica fillers made of phlogopite is used, the molding processability of the liquid crystalline polyester resin composition tends to be low. As a result, when a molded article having a thin wall portion is formed using the composition comprising such mica fillers, the resulting molded article tends to have warpage.

The mica fillers preferably have a particle shape having a volume-average particle diameter of 40 μm or less, which can be measured by a laser diffraction particle size distribution analyzer. The mica fillers more preferably have a volume-average particle diameter of 25 μm or less. When the volume-average particle diameter is more than 40 μm, the melt fluidity of the liquid crystalline polyester resin composition tends to be deteriorated and it may be difficult to attain a molded article having a thin wall portion.

Further, the mica fillers preferably have a specific surface area (measured by a BET method) of 6 $m^2/g$ or less, and more preferably have a specific surface area of 4 $m^2/g$ or less. When the specific surface area is larger than 6 $m^2/g$, the amount of moisture adhering to the surface of the mica increases and hydrolysis of the liquid crystalline polyester is apt to occur due to the influence of the adhering moisture. Therefore, appearance anomaly such as blister or the like resulting from a decomposition product of the liquid crystalline polyester may be produced in the molded article to be obtained. In addition, the adhering moisture referred to herein is identified by a heating and drying method moisture analyzer, and the content of the adhering moisture of the mica is preferably 0.30% by mass or less, and more preferably 0.25% by mass or less.

Examples of commercially available mica fillers which satisfy a suitable volume-average particle diameter and a suitable specific surface area, described above, include "AB-25S" produced by YAMAGUCHI MICA Co., Ltd.

The mica fillers is contained in the liquid crystalline polyester composition of the present invention preferably in an amount of from 15 to 30 parts by mass and more preferably in an amount of from 15 to 25 parts by mass, with respect to 100 parts by mass of liquid crystalline polyester. When the proportion of the mica fillers is within the above-mentioned range, there is an advantage that the decomposition of the liquid crystalline polyester is prevented with reliability and an appearance anomaly does not occur.

In the liquid crystalline polyester composition of the present invention, carbon fibers also contained as another component.

Since the carbon fibers are composed of organic components, it has a lower specific gravity than that of the fibrous filler composed of inorganic components, accordingly, a weight of a molded article formed by using the liquid crystalline polyester resin composition can be reduced. By reducing the weight like this, for example when a holder for optical pickup lenses is prepared by use of the liquid crystalline polyester resin composition, it is possible to improve the sensitivity of focusing of the holder for optical pickup lenses.

Any carbon fiber can be used in the present invention. Examples of the carbon fibers include pitch-based carbon fibers, PAN-based carbon fibers and rayon-based carbon fibers. Among them, the pitch-based carbon fiber is preferably used in the present invention because it has the largest specific modulus.

While the carbon fibers may be produced by undergoing a firing step, the specific modulus and the specific volume resistance of the carbon fibers are controlled by the firing conditions. For example, the holder for optical pickup lenses is required to have electrical insulation and it is preferred for using the carbon fiber that the carbon fiber has specific volume resistance of $10^8$ Ωcm or more. When the specific volume resistance is less than $10^8$ Ωcm, a spark due to a locally high current may easily occur to cause a short circuit of a coil part (magnetic wire).

The carbon fibers used in the present invention preferably have a mean fiber diameter of 5 to 15 μm and a mean fiber length of 1 to 8 mm, and more preferably have a mean fiber diameter of 10 to 15 μm and a mean fiber length of 3 to 7 mm. When the mean fiber diameter is less than 5 μm or the mean fiber length is less than 1 mm, it is not preferred in that the anisotropy of mechanical properties of a molded article formed by using the liquid crystalline polyester resin composition becomes large and further the modulus of the molded article deceases. On the other hand, when the mean fiber diameter is more than 15 μm or the mean fiber length is more than 8 mm, it is not preferred in that the fluidity of a thin wall of the liquid crystalline polyester resin composition is deteriorated and therefore it becomes difficult to attain a molded article having a thin wall portion.

Further, the carbon fibers preferably have a specific modulus of 30 GPa or more from the viewpoint of increasing the rigidity of the optical pickup member. When the specific modulus is 30 GPa or more, since it is larger than that of a glass fiber generally used as a fibrous filler, the reduction in weight and the increase in rigidity of the molded article can be simultaneously realized. However, it is not always preferred to use carbon fibers having a very large value of specific modulus. This is because the specific volume resistance tends to decrease with the increase in the modulus. While the specific modulus is not limited, while it is typically 35 GPa or smaller.

The carbon fibers is contained in the liquid crystalline polyester composition of the present invention preferably in an amount of from 5 to 20 parts by mass, and more preferably in an amount of from 10 to 15 parts by mass with respect to 100 parts by mass of liquid crystalline polyester. When the amount of the carbon fibers is less than the amounts in this range, the rigidity of a molded article formed by using the liquid crystalline polyester resin composition changes little and a highly-functional optical pickup member is not attained. On the other hand, when the amount of the carbon fibers is more than the amounts in this range, it is not preferable because the granulating property and the moldability of the liquid crystalline polyester resin composition are deteriorated.

The liquid crystalline polyester composition of the present invention may further comprises hollow fillers as an optional component, in addition to the mica fillers and the like. The usage of the hollow fillers is preferred in reducing the weight of a molded article of the liquid crystalline polyester resin composition. For example, when a holder for optical pickup lenses is prepared by using the liquid crystalline polyester resin composition composing the hollow fillers, it becomes possible to improve the sensitivity of focusing of the holder for optical pickup lenses because of the reduced weight.

Any hollow filler can be used in the present invention. Examples of the hollow filler include Shirasu balloon, glass balloon, ceramic balloon, organic resin balloon and fullerene. Among these, glass balloon is particularly preferable in point of ease of availability and being hardly damaged.

The volume-average particle diameter of the hollow fillers is preferably 5 to 100 μm, more preferably 10 to 50 μm, and furthermore preferably 20 to 40 μm. When the volume-average particle diameter of the hollow fillers is too large, strength of the hollow filler tends to decrease and the hollow fillers itself is vulnerable to fracture. On the other hand, when the average particle diameter of the hollow fillers is too small, since its surface area increases, there is a possibility that the hollow fillers may be vulnerable to taking up of moisture and hydrolysis of the liquid crystalline polyester may be promoted at the time of granulation. The strength of the hollow fillers is preferably 9800 N/cm² or more, preferably 9800 to 17600 N/cm², or more preferably 11800 to 17600 N/cm².

The volume hollow ratio of the hollow fillers is preferably 40 to 80%, and more preferably 60 to 80%. In addition, the volume hollow ratio (unit: %) referred to herein is an approximate value calculated by the following equation.

(Volume hollow ratio)=100×{(1−(σ1/σ2)}

In the above equation, σ1 represents a true specific gravity of the hollow fillers, and σ2 represents a specific gravity of a material of the hollow fillers.

Specific examples of the hollow fillers which satisfy such the suitable volume-average particle diameter, strength and volume hollow ratio include Glass Bubbles "S60HS" (strength 12300 N/cm², volume-average particle diameter 27 μm, volume hollow ratio 76%) produced by Sumitomo 3M Limited.

The hollow fillers may be contained in the liquid crystalline polyester composition of the present invention in an amount of 10 parts by mass or less with respect to 100 parts by mass of liquid crystalline polyester. When the amount of the hollow fillers is more than 10 parts by mass, a weight of a molded article formed by using the liquid crystalline polyester resin composition is reduced, but the molded article tends to decrease in rigidity, which is not preferred.

Mixing of the respective components (the liquid crystalline polyester, the mica fillers, the carbon fibers and the hollow fillers) for obtaining the liquid crystalline polyester resin composition can be carried out by various publicly known methods. Examples of the various publicly known methods include a method of supplying the respective components separately to a melt mixing machine to mix them, and a method of pre-mixing all components with a mortar, a Henschel mixer, a ball mill, or a ribbon blender, and supplying the resulting mixture to a melt mixing machine.

In these methods for producing a liquid crystalline polyester resin composition, in the case of using the liquid crystalline polyester having a flow beginning temperature of 360° C. or higher as a component, a method, in which the liquid crystalline polyester, the mica fillers and the carbon fibers are put in a melt mixing machine and are adequately melt mixed in the machine and after the melt viscosity of the resulting mixture reaches the lowest, the hollow fillers are mixed in order to prevent the fracture of the hollow fillers with reliability, is preferably employed. Accordingly, when an extrusion melt kneading machine is used, a melt kneading method, in which the liquid crystalline polyester, the mica fillers and the carbon fibers are fed from an upstream side and the hollow fillers are fed from a midstream side (downstream side) of the melt kneading machine, is employed.

In addition, as a means for molding a molded article composing the bobbin 2, injection molding is particularly preferable in that a molded article having a thin wall portion is easily prepared.

The injection molding will be described below in more detail. A molding temperature is preferably set at a temperature which is higher by 10 to 80° C. than the flow beginning temperature of the liquid crystalline polyester as a reference. When the molding temperature is within this range, the liquid crystalline polyester resin composition exerts excellent melt fluidity and can exert good moldability even in a holder for optical pickup lenses having a thin wall portion or a holder for optical pickup lenses having a complicated shape. Further, demands for reducing the weight and the cost on such the holder for optical pickup lenses increase and the holder's configuration tends to increasingly become thin wall. In accordance with the liquid crystalline polyester resin composition, it is easy to mold a holder for optical pickup lenses having a thin wall portion of 0.1 mm to 1.5 mm in thickness. Furthermore, when the holder for optical pickup lenses having a relatively short flow length is molded, it is possible to mold with high dimensional accuracy even in molding a holder for optical pickup lenses having a thin wall portion of 0.05 mm to 0.15 mm in thickness. Further, the molded article thus obtained is superior in rigidity typified by the flexural modulus (MD direction) and the torsional modulus (TD direction) without impairing excellent heat resistance of the liquid crystalline polyester.

Since the holder 1 for optical pickup lenses has a constitution described above, the bobbin 2 composed of a molded article obtained by molding the liquid crystalline polyester resin composition is a bobbin having a low specific gravity which is practical for the bobbin 2. For example, it is possible to obtain a molded article having such a low specific gravity that the specific gravity determined according to ASTM (American Society for Testing and Materials) D792 (method A) is within the range of 1.30 to 1.55, and the molded article has an adequately high flexural modulus and an adequately high torsional modulus, which provide an indication of rigidity. Therefore, when the molded article is used as the bobbin 2 of the holder 1 for optical pickup lenses, it can improve a damping property of the holder 1 for optical pickup lenses and can improve reading performance of laser light. Accordingly, the molded article is particularly suitable as the bobbin 2 of the holder 1 for optical pickup lenses, which increasingly requires reduction in thickness and complication of shape.

The liquid crystalline polyester resin composition of the present invention may further comprise one or more kinds of resins other than the liquid crystalline polyester, firers other than the mica fillers, the carbon fibers and the hollow fillers, additives and the like as optional component(s), as long as the effects of the present invention are not impaired.

Examples of such other resins include thermoplastic resins such as polyamide, polyester, polyphenylene sulfide, polyether ketone, polycarbonate, polyphenylene ether and modification products thereof, polysulfone, polyether sulfone and polyether imides; and thermosetting resins such as phenolic resin, epoxy resin and polyimide resin.

Examples of such other fillers include fibrous inorganic fillers such as glass fibers, carbon fibers, wollastonite, aluminum borate whisker, potassium titanate whisker, silica-alumina fibers, and alumina fibers. These fillers may be used singly, or may be used in combination of two or more species. Examples of spherical inorganic filler include glass beads, silica beads and the like. Such other additives may be commonly used ones in this area, and examples thereof include releasability improvers such as fluororesins and metal soaps; coloring agents such as dyes and pigments; antioxidants; thermal stabilizers; ultraviolet absorbers; antistatic agents; and surfactants. Further, additives having external lubricating effects such as higher fatty acids, higher fatty acid esters, higher fatty acid metal salts and fluorocarbon-based surfactants may be used.

While in Embodiment 1 described above, the holder 1 for optical pickup lenses in which one optical conduction hole 3 is formed in the bobbin 2 has been described, the present invention can also be applied to a holder 1 for optical pickup lenses, in which two or more optical conduction holes 3 are formed in the bobbin 2.

Furthermore, while in Embodiment 1 described above a molded article obtained by molding the liquid crystalline polyester resin composition is used as a bobbin 2 of the holder 1 for optical pickup lenses, the molded article can also be applied to the purpose (for example, base frame, actuator body) other than the bobbin 2 of the holder 1 for optical pickup lenses.

EXAMPLES

The present invention is described in more detail by following Examples, which should not be construed as a limitation upon the scope of the present invention.

Example 1

Into a reactor equipped with a stirrer, a torque meter, a nitrogen gas introducing tube, a thermometer and a reflux condenser, 830.7 g (5.0 mol) of p-hydroxybenzoic acid, 465.5 g (2.5 mol) of 4,4'-dihydroxybiphenyl, 394.6 g (2.375 mol) of terephthalic acid, 20.8 g (0.125 mol) of isophthalic acid and 1153 g (11.0 mol) of acetic anhydride were charged. The atmosphere in the reactor was adequately replaced with a nitrogen gas and then heated to 150° C. over 15 minutes under a nitrogen gas stream, and the mixture was refluxed for 180 minutes while maintaining the temperature. Thereafter, the mixture was heated to 320° C. over 2 hours and 50 minutes while distilling off acetic acid produced as a by-product and unreacted acetic anhydride. After completion of the reaction, namely, an increase in torque was recognized, contents of the reactor were taken out. The resulting contents were cooled to room temperature and ground by a coarse grinder, and the ground substance was heated to 250° C. from room temperature over one hour under a nitrogen atmosphere, heated to 325° C. from 250° C. over 5 hours and maintained at 325° C. for 3 hours to perform the solid phase polymerization reaction. Thereafter, a reactant was cooled and the resulting liquid crystalline polyester was taken out. A flow beginning temperature of this liquid crystalline polyester was 380° C. With respect to the molar ratio of the structural units of the liquid crystalline polyester, (C1)/(A1)=0.5, [(B1)+(B2)]/(C1)=1, and (B2)/(B1)=0.05.

In addition, the flow beginning temperature of the liquid crystalline polyester was measured in the following manner. That is, about 2 g of liquid crystalline polyester was filled in a capillary type rheometer equipped with a die having an inner diameter of 1 mm and a length of 10 mm by using a flow tester "CFT-500 Type" manufactured by Shimadzu Corporation. Then, a temperature, at which the liquid crystalline polyester exhibits melt viscosity of 4800 Pa·sec (48000 poises), is measured while extruding the liquid crystalline polyester from a nozzle at a temperature rise rate of 4° C./min under a load of 9.8 MPa (100 kgf/cm$^2$) and this temperature is considered as a flow beginning temperature.

In 100 parts by mass of the liquid crystalline polyester, 19.9 parts by mass of mica filler "AB-25S" produced by YAMAGUCHI MICA Co., Ltd. and 7.9 parts by mass of carbon fibers "K223Y1" (mean fiber diameter 13 μm, mean fiber length 6 mm, specific volume resistance $10^8$ Ωcm) produced by Mitsubishi Chemical Corp. were mixed, and then the resulting mixture was granulated at a cylinder temperature of 390° C. while deaerating the extruder in a vacuum vent by use of a twin-screw extruder "PCM-30" manufactured by IKEGAI Corporation and a water-sealed vacuum pump "SW-25" manufactured by SHINKO SEIKI Co., Ltd. to obtain pellet-shaped liquid crystalline polyester resin composition. Then, the liquid crystalline polyester resin composition was molded to obtain a molded article.

Example 2

In 100 parts by mass of liquid crystalline polyester prepared by following the same procedure as in Example 1 described above, 23.1 parts by mass of mica filler "AB-25S" produced by YAMAGUCHI MICA Co., Ltd. and 18.2 parts by mass of carbon fibers "K223Y1" produced by Mitsubishi Chemical Corp. were mixed and then a liquid crystalline polyester film was produced by following the same procedure as in Example 1 described above to obtain a molded article.

Example 3

In 100 parts by mass of liquid crystalline polyester prepared by following the same procedure as in Example 1 described above, 23.1 parts by mass of mica filler "AB-25S" produced by YAMAGUCHI MICA Co., Ltd, 18.2 parts by mass of carbon fibers "K223Y1" produced by Mitsubishi Chemical Corp. and 6.36 parts by mass of hollow fillers "Glass Bubbles S60HS" (strength 12300 N/cm$^2$, volume-average particle diameter 27 μm, volume hollow ratio 76%) produced by Sumitomo 3M Ltd. were mixed, and then a liquid crystalline polyester film was produced by following the same procedure as in Example 1 described above to obtain a molded article.

Example 4

In 100 parts by mass of liquid crystalline polyester prepared by following the same procedure as in Example 1 described above, 19.9 parts by mass of mica filler "AB-21S" produced by YAMAGUCHI MICA Co., Ltd. and 7.9 parts by mass of carbon fibers "K223Y1" produced by Mitsubishi Chemical Corp. were mixed, and then a liquid crystalline polyester film was produced by following the same procedure as in Example 1 described above to obtain a molded article.

Example 5

In 100 parts by mass of liquid crystalline polyester prepared by following the same procedure as in Example 1 described above, 19.9 parts by mass of mica filler "AB-41S" produced by YAMAGUCHI MICA Co., Ltd. and 7.9 parts by mass of carbon fibers "K223Y1" produced by Mitsubishi Chemical Corp. were mixed, and then a liquid crystalline polyester film was produced by following the same procedure as in Example 1 described above to obtain a molded article.

Comparative Example 1

In 100 parts by mass of liquid crystalline polyester prepared by following the same procedure as in Example 1 described above, 23.1 parts by mass of mica filler "AB-25S" produced by YAMAGUCHI MICA Co., Ltd. and 18.2 parts by mass of carbon fibers "K223QG" (mean fiber diameter 11 μm, mean fiber length 6 mm, specific volume resistance $10^3$ Ωcm) produced by Mitsubishi Chemical Corp. were mixed, and then a liquid crystalline polyester film was produced by following the same procedure as in Example 1 described above to obtain a molded article.

Comparative Example 2

In 100 parts by mass of liquid crystalline polyester prepared by following the same procedure as in Example 1 described above, 19.9 parts by mass of mica filler "AB-25S" produced by YAMAGUCHI MICA Co., Ltd. and 22.7 parts by mass of carbon fibers "K223Y1" produced by Mitsubishi Chemical Corp. were mixed, and then it was tried to produce a liquid crystalline polyester film by following the same procedure as in Example 1 described above, but the liquid crystalline polyester film could not be prepared because a granulating property of the resin composition was poor.

Comparative Example 3

In 100 parts by mass of liquid crystalline polyester prepared by following the same procedure as in Example 1 described above, 17.6 parts by mass of mica filler "AB-25S" produced by YAMAGUCHI MICA Co., Ltd. was mixed, and then a liquid crystalline polyester film was produced by following the same procedure as in Example 1 described above to obtain a molded article.

Comparative Example 4

In 100 parts by mass of liquid crystalline polyester prepared by following the same procedure as in Example 1 described above, 17.6 parts by mass of carbon fibers "K223Y1" produced by Mitsubishi Chemical Corp. was mixed, and then a liquid crystalline polyester film was produced by following the same procedure as in Example 1 described above to obtain a molded article.

Comparative Example 5

In 100 parts by mass of liquid crystalline polyester prepared by following the same procedure as in Example 1 described above, 17.6 parts by mass of aluminum borate whiskers "Albolex Y (ABY)" (mean fiber diameter 0.8 μm, mean fiber length 20 μm) produced by SHIKOKU CHEMICALS Corp. was mixed, and then a liquid crystalline polyester film was produced by following the same procedure as in Example 1 described above to obtain a molded article.

Comparative Example 6

In 100 parts by mass of liquid crystalline polyester prepared by following the same procedure as in Example 1 described above, 19.9 parts by mass of mica filler "AB-25S" produced by YAMAGUCHI MICA Co., Ltd. and 7.9 parts by mass of aluminum borate whiskers "Albolex Y (ABY)" produced by SHIKOKU CHEMICALS Corp. were mixed, and then a liquid crystalline polyester film was produced by following the same procedure as in Example 1 described above to obtain a molded article.

Comparative Example 7

In 100 parts by mass of liquid crystalline polyester prepared by following the same procedure as in Example 1 described above, 21.4 parts by mass of mica filler "AB-25S" produced by YAMAGUCHI MICA Co., Ltd. and 21.4 parts by mass of hollow fillers "Glass Bubbles S60HS" produced by Sumitomo 3M Ltd. were mixed, and then a liquid crystalline polyester film was produced by following the same procedure as in Example 1 described above to obtain a molded article.

<Properties of Mica Fillers>

The volume-average particle diameters of the mica fillers used in Examples 1 to 5 and Comparative Examples 1 to 3, 6 and 7 were measured by use of a laser diffraction particle size distribution analyzer "MASTERSIZER 2000" manufactured by SYSMEX Corp. and consequently the volume-average particle diameter was 21 μm for "AB-25S", 19 μm for "A-21S", and 47 μm for "A-41S". The specific surface areas of the same mica fillers were measured according to ASTM D792 by use of a BET surface area analyzer "HM model-1208" manufactured by MOUNTECH Co., Ltd. and consequently the BET surface area was 4 $m^2$/g for "AB-25S", 11 $m^2$/g for "A-21S", and 3 $m^2$/g for "A-41S". Furthermore, the moisture contents of the same mica fillers were measured by use of a heating and drying method moisture analyzer manufactured by A & D Co., Ltd. and consequently the moisture content was 0.21% for "AB-25S", 0.50% for "A-21S", and 0.20% for "A-41S".

<Measurement of Specific Gravity of Molded Article>

The liquid crystalline polyester resin compositions in Examples 1 to 5 and Comparative Examples 1, and 3 to 7 were molded into test pieces (thickness of 0.5 mm) of dumbbells No. 1/No. 2 according to JIS K 7113 under the molding conditions of a cylinder temperature of 400° C., a mold temperature of 130° C. and an injection speed of 60% using an injection molding machine "PS40E1ASE" manufactured by NISSEI PLASTIC INDUSTRIAL Co., Ltd. Then, specific gravities of these test pieces were measured according to ASTM D792 (method A). The results of measurements are shown in Table 1.

In addition, the specific gravity of the resin composition of Comparative Example 2 was not measured since the resin composition could not be granulated.

<Measurement of Specific Volume Resistance in of Molded Article>

The liquid crystalline polyester resin compositions in Examples 1 to 5 and Comparative Examples 1, 3 and 4 were molded into flat plate test pieces having a size of 64 mm×64 mm (thickness of 3 mm) under the molding conditions of a cylinder temperature of 400° C., a mold temperature of 130° C. and an injection speed of 60% using an injection molding machine "PS40E1ASE" manufactured by NISSEI PLASTIC INDUSTRIAL Co., Ltd. Then, specific volume resistances (unit: Ωcm) of these flat plate test pieces were measured using an ultra-insulation meter "SM-10E Model" manufactured by DKK-TOA Corp.. The results of measurements are shown in Table 1.

In addition, the specific volume resistances of the resin composition of Comparative Examples 2, and 5 to 7 were not measured.

<Measurement of Flexural Modulus (MD Direction) of Molded Article>

The liquid crystalline polyester resin compositions in Examples 1 to 5 and Comparative Examples 1, and 3 to 7 were molded into test pieces (thickness of 0.5 mm) of dumbbells No. 1/No. 2 according to JISK7113 under the molding conditions of a cylinder temperature of 400° C., a mold temperature of 130° C. and an injection speed of 60% using an injection molding machine"PS40E1ASE" manufactured by NISSEI PLASTIC INDUSTRIAL Co., Ltd. Then, flexural modulus (unit: MPa) of these test pieces was measured according to ASTM D790. The results of measurements are shown in Table 1.

In addition, the flexural modulus of the resin composition of Comparative Example 2 was not measured since the resin composition could not be granulated.

<Measurement of Torsional Modulus (TD Direction) of Molded Article>

The liquid crystalline polyester resin compositions in Examples 1 to 5 and Comparative Examples 1, and 3 to 7 were molded into test pieces (thickness of 0.5 mm) of dumbbells No. 1/No. 2 according to JISK7113 under the molding conditions of a cylinder temperature of 400° C., a mold temperature of 130° C. and an injection speed of 80% using an injection molding machine "PS40E1ASE" manufactured by NISSEI PLASTIC INDUSTRIAL Co., Ltd, and then each of these test pieces was cut into a strip piece having a size of 5 mm×35 mm. Then, storage elastic moduli (torsional moduli, unit: MPa) at 80 Hz of these pieces at 23° C. were measured using "Dynamic Analyzer RDA-II manufactured by Rheometric Scientific F.E. Ltd. The results of measurements are shown in Table 1.

In addition, the torsional modulus of the resin composition of Comparative Example 2 was not measured since the resin composition could not be granulated.

<Calculation of Specific Flexural Modulus of Molded Article>

The specific flexural moduli (unit: MPa) of Examples 1 to 5 and Comparative Examples 1, and 3 to 7 were calculated by dividing the flexural modulus by the specific gravity. The results of calculations are shown in Table 1.

In addition, the specific flexural modulus of Comparative Example 2 was not calculated since the flexural modulus and the specific gravity were not measured.

<Calculation of Specific Torsional Modulus of Molded Article>

The specific torsional moduli (unit: MPa) of Examples 1 to 5 and Comparative Examples 1, and 3 to 7 were calculated by dividing the torsional modulus by the specific gravity. The results of calculations are shown in Table 1.

In addition, the specific torsional modulus of Comparative Example 2 was not calculated since the flexural modulus and the specific gravity were not measured.

Figure 2:
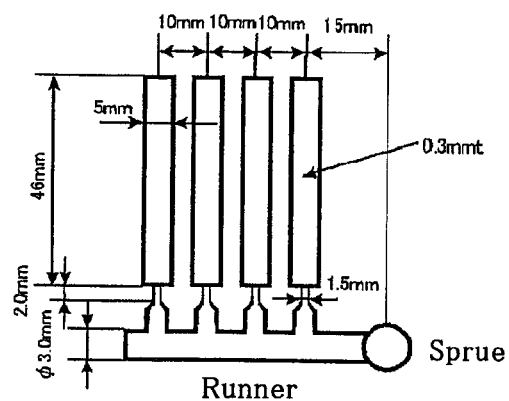
FIG. 2 is a view showing a mold used in measurement of a flow length of thin wall in Examples.

The liquid crystalline polyester resin compositions in Examples 1, 4 and 5 were molded with a mold (0.3 mm in thickness) shown in FIG. 2 under the molding conditions of a cylinder temperature of 390° C., 400° C. or 410° C., a mold temperature of 130° C. and an injection speed of 60% using an injection molding machine "PS40E1ASE" manufactured by NISSEI PLASTIC INDUSTRIAL Co., Ltd. Then, lengths of cavity portions (4 locations per one molded article) of the five molded articles obtained for each Example were measured. An average of these lengths (4 locations per one molded article×5 molded articles) was taken as a flow length of thin wall. The results of measurements are shown in Table 1.

TABLE 1

|  |  | Example 1 | Example 2 | Example 3 | Example 4 | Example 5 | Comparative Example 1 | Comparative Example 2 |
|---|---|---|---|---|---|---|---|---|
| Liquid crystalline polyester resin composition (parts by weight) | LCP1 | 100 | 100 | 100 | 100 | 100 | 100 | 100 |
|  | AB25S | 19.9 | 23.1 | 23.1 |  |  | 23.1 | 19.9 |
|  | A21S |  |  |  | 19.9 |  |  |  |
|  | A41S |  |  |  |  | 19.9 |  |  |
|  | K223Y1 | 7.9 | 18.2 | 18.2 | 7.9 | 7.9 |  | 22.7 |
|  | S60HS |  |  | 6.6 |  |  |  |  |
|  | K223QG |  |  |  |  |  | 18.2 |  |
|  | ABY |  |  |  |  |  |  |  |
| Results of property measurements | Granulating property | ○ | ○ | ○ | ○ | ○ | ○ | X |
|  | Specific gravity | 1.49 | 1.51 | 1.46 | 1.48 | 1.48 | 1.56 |  |
|  | Specific volume resistance (Ω cm) | $2 \times 10^2$ | $5 \times 10^9$ | $7 \times 10^9$ | $7 \times 10^{11}$ | $7 \times 10^{12}$ | $1 \times 10^4$ |  |
|  | Flexural modulus (MPa) | 25.0 | 25.3 | 23.6 | 24.4 | 25.8 | 27.2 |  |
|  | Torsional modulus (MPa) | 2.9 | 3.3 | 3.0 | 2.8 | 2.7 | 3.3 |  |

TABLE 1-continued

| | | | | | | |
|---|---|---|---|---|---|---|
| Specific flexural modulus (MPa) | 16.8 | 16.8 | 16.2 | 16.5 | 17.4 | 17.4 |
| Specific torsional modulus (MPa) | 1.94 | 2.19 | 2.05 | 1.89 | 1.82 | 2.12 |
| Flow length of thin wall (mm/390° C.) | 15 | | | 17 | 9 | |
| Flow length of thin wall (mm/400° C.) | 25 | | | 26 | 18 | |
| Flow length of thin wall (mm/410° C.) | 31 | | | 33 | 24 | |

| | | Comparative Example 3 | Comparative Example 4 | Comparative Example 5 | Comparative Example 6 | Comparative Example 7 |
|---|---|---|---|---|---|---|
| Liquid crystalline polyester resin composition (parts by weight) | LCP1 | 100 | 100 | 100 | 100 | 100 |
| | AB25S | 17.6 | | | 19.9 | 21.4 |
| | A21S | | | | | |
| | A41S | | | | | |
| | K223Y1 | | 17.6 | | | |
| | S60HS | | | | | 21.4 |
| | K223QG | | | | | |
| | ABY | | | 17.6 | 7.9 | |
| Results of property measurements | Granulating property | ○ | ○ | ○ | ○ | ○ |
| | Specific gravity | 1.53 | 1.40 | 1.55 | 1.57 | 1.32 |
| | Specific volume resistance (Ω cm) | $9 \times 10^{14}$ | $1 \times 10^{10}$ | | | |
| | Flexural modulus (MPa) | 23.1 | 25.5 | 24.1 | 23.3 | 14.8 |
| | Torsional modulus (MPa) | 2.8 | 1.9 | 1.3 | 2.6 | 2.3 |
| | Specific flexural modulus (MPa) | 15.1 | 18.2 | 15.5 | 14.8 | 11.2 |
| | Specific torsional modulus (MPa) | 1.83 | 1.36 | 0.84 | 1.66 | 1.74 |
| | Flow length of thin wall (mm/390° C.) | | | | | |
| | Flow length of thin wall (mm/400° C.) | | | | | |
| | Flow length of thin wall (mm/410° C.) | | | | | |

In Table 1, "LCP1" represents liquid crystalline polyester, "AB-25S" represents mica filler "AB-25S" produced by YAMAGUCHI MICA Co., Ltd., "A-21S" represents mica filler "A-21S" produced by YAMAGUCHI MICA Co., Ltd., "A-41S" represents mica filler "A-41S" produced by YAMAGUCHI MICA Co., Ltd., "K223Y1" represents a carbon fiber "K223Y1" produced by Mitsubishi Chemical Corp., "S60HS" represents a hollow filler "Glass Bubbles S60HS" produced by Sumitomo 3M Ltd., "K223QG" represents a carbon fiber "K223QG" produced by Mitsubishi Chemical Corp., and "ABY" represents an aluminum borate whisker "Albolex Y (ABY)" produced by SHIKOKU CHEMICALS Corp. Further, in the column of "granulating property" in Table 1, a symbol "○" indicates that the granulating property is good and a symbol "×" indicates that the granulating property is not good.

<Evaluation of Electrical Insulation and Specific Rigidity of Molded Article>

Since in the holder for optical pickup lenses, the bobbin is required to have electrical insulation because of generation of a magnetic field as described above, the electrical insulation of a molded article, which is a material of the bobbin, was evaluated based on the specific volume resistance. Further, the specific rigidity (value obtained by diving the rigidity in a MD direction and a TD direction by the specific gravity) of the molded article was evaluated based on the specific modulus (specific flexural modulus and specific torsional modulus). As the results of these, it is found that molded articles in Comparative Examples 1, and 3 to 7 have problems in electrical insulation or specific rigidity and on the other hand, molded articles in Examples 1 to 3 exhibit excellent electrical insulation and exert high specific rigidity.

That is, as is apparent from Table 1, in Comparative Example 1, the specific gravity was as large as 1.56 and the specific volume resistance was as small as $1\times10^4$ Ωcm. Further, in Comparative Example 3, the specific gravity was as large as 1.53, the specific flexural modulus was as low as 15.1 MPa, and the specific torsional modulus was as low as 1.83 MPa. In Comparative Example 4, the specific torsional modulus was as significantly low as 1.36 MPa. Further, in Comparative Example 5, the specific gravity was as large as 1.55, the specific flexural modulus was as low as 15.5 MPa, and the specific torsional modulus was as significantly low as 0.84 MPa. Further, in Comparative Example 6, the specific gravity was as large as 1.57, the specific flexural modulus was as low as 14.8 MPa, and the specific torsional modulus was as low as 1.66 MPa. Furthermore, in Comparative Example 7, the specific flexural modulus was as significantly low as 11.2 MPa and the specific torsional modulus was as low as 1.74 MPa. Therefore, the molded articles in Comparative Examples 1, 3 to 7 resulted in insufficient electrical insulation and reduction in specific rigidity.

On the other hand, in Examples 1 to 5, the specific gravity was as small as 1.46 to 1.51 and the specific volume resistance was $5\times10^9$ Ωcm or more, and moreover the specific flexural modulus was as high as 16.2 to 17.4 MPa, and the specific torsional modulus was as high as 1.82 to 2.19 MPa. Therefore, in Examples 1 to 5, the electrical insulation was excellent and the rigidity in a MD direction and a TD direction was high even though the specific gravity was small.

Further, with respect to Examples 1, 4 and 5, these Examples are the same in that 19.9 parts by mass of mica fillers and 7.9 parts by mass of hollow sphere were mixed in 1 part by mass of LCP and these Examples are different in the species of the mica fillers from one another, and in Examples 1 and 4, since the volume-average particle diameter of mica fillers is 40 μm or less, the flow length of thin wall is larger than that of Example 5 in which the volume-average particle diameter of mica fillers is more than 40 μm, that is, the molded articles in Examples 1 and 4 are excellent in the melt fluidity.

The present invention can be widely applied to molded articles having a thin wall portion in addition to optical pickup members such as a holder for optical pickup lenses, a base frame and the like.

What is claimed is:

1. A liquid crystalline polyester resin composition comprising:
   mica fillers in an amount of 15 to 30 parts by mass; and
   carbon fibers with specific volume resistance of $10^8$ Ωcm or more in an amount of 5 to 20 parts by mass with respect to 100 parts by mass of the liquid crystalline polyester.

2. The liquid crystalline polyester resin composition according to claim 1 further comprising hollow fillers in an amount of 10 parts by mass or less with respect to 100 parts by mass of the liquid crystalline polyester.

3. The liquid crystalline polyester resin composition according to claim 1, wherein the liquid crystalline polyester has a flow beginning temperature of 360° C. or higher.

4. The liquid crystalline polyester resin composition according to claim 1, wherein the mica has a volume-average particle diameter of 40 μm or less.

5. The liquid crystalline polyester resin composition according to claim 1, wherein the mica has a specific surface area of 6 m²/g or less.

6. The liquid crystalline polyester resin composition according to claim 1, wherein the carbon fiber has a specific modulus of 30 GPa or more.

7. A molded article formed by molding the liquid crystalline polyester resin composition according to claim 1.

8. The molded article according to claim 7, wherein the article has a specific gravity of from 1.30 to 1.55 determined by method A defined in ASTM D792.

9. A holder for optical pickup lenses comprising the molded article according to claim 7 as a bobbin.

* * * * *